(12) United States Patent
Fok et al.

(10) Patent No.: US 8,023,937 B2
(45) Date of Patent: Sep. 20, 2011

(54) APPARATUS AND METHODS FOR DETERMINING VOICE AND/OR DATA PROCESSING PERFORMANCE OF A WIRELESS DEVICE

(75) Inventors: Kenny Fok, San Diego, CA (US); Tia Manning Cassett, San Diego, CA (US); Jihyun Hwang, San Diego, CA (US); Eric Chi Chung Yip, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 11/251,298

(22) Filed: Oct. 14, 2005

(65) Prior Publication Data

US 2006/0198359 A1 Sep. 7, 2006

Related U.S. Application Data

(60) Provisional application No. 60/665,293, filed on Mar. 25, 2005, provisional application No. 60/658,983, filed on Mar. 4, 2005.

(51) Int. Cl.
*H04W 24/00* (2009.01)

(52) U.S. Cl. .................. 455/423; 455/67.11; 455/550.1; 455/561; 455/418

(58) Field of Classification Search .................. 455/67.1, 455/67.11, 423, 425
See application file for complete search history.

(56) References Cited

U.S. PATENT DOCUMENTS

| | | | | |
|---|---|---|---|---|
| 6,088,588 | A * | 7/2000 | Osborne ....................... | 455/425 |
| 6,169,883 | B1 * | 1/2001 | Vimpari et al. ............. | 455/67.11 |
| 6,915,128 | B1 * | 7/2005 | Oh ................................ | 455/424 |
| 7,020,598 | B1 * | 3/2006 | Jacobson ........................ | 703/14 |
| 7,463,590 | B2 * | 12/2008 | Mualem et al. ............... | 370/241 |
| 2003/0142629 | A1 | 7/2003 | Krishnamurthi et al. | |
| 2004/0058651 | A1 * | 3/2004 | Ross et al. .................. | 455/67.11 |
| 2004/0058652 | A1 * | 3/2004 | McGregor et al. .......... | 455/67.13 |
| 2005/0172141 | A1 * | 8/2005 | Gayde et al. .................. | 713/191 |

FOREIGN PATENT DOCUMENTS

| | | |
|---|---|---|
| EP | 1 309 214 A1 | 5/2003 |
| JP | 10150392 | 6/1998 |
| JP | 2006521752 | 9/2006 |
| KR | 20040061027 | 7/2004 |

OTHER PUBLICATIONS

International Search Report and Written Opinion—PCT/US2006/008135, International Search Authority—European Patent Office—Jun. 29, 2006.

* cited by examiner

*Primary Examiner* — Kamran Afshar
*Assistant Examiner* — Vladimir Magloire
(74) *Attorney, Agent, or Firm* — Stanton Braden

(57) ABSTRACT

Apparatus, methods, processors and computer readable media for determining the voice and/or data processing performance or capability of a wireless device. Embodiments include a wireless device having a computer platform with a processing engine operable to generate a plurality of performance data during voice and/or data processing activities on the wireless device. The wireless device further includes a voice/data performance module operable to collect selected ones of the plurality of performance data associated with a predetermined voice and/or data processing capability of the wireless device. The embodiments may also include an apparatus operable to receive the collected performance data and to generate a performance report characterizing a voice and/or data processing performance or capability of the wireless device.

46 Claims, 4 Drawing Sheets

APPARATUS AND METHODS FOR DETERMINING VOICE AND/OR DATA PROCESSING PERFORMANCE OF A WIRELESS DEVICE

CLAIM OF PRIORITY UNDER 35 U.S.C. §119

The present Application for Patent claims priority to Provisional Application No. 60/665,293 entitled "Methods And Apparatus For Collecting And Reporting Performance Parameters For A Wireless Device," filed Mar. 25, 2005, and to Provisional Application No. 60/658,983 entitled "Method And System For Performing A Test On A Wireless Device, "filed Mar. 4, 2005, both assigned to the assignee hereof and both hereby expressly incorporated by reference herein.

BACKGROUND

The described embodiments generally relate to wireless communications devices and computer networks. More particularly, the described embodiments relate to apparatus and methods for determining voice and/or data processing performance of a wireless device, along with the collection, reporting and analysis of voice/data processing-related data from the wireless device.

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network. In order for the wireless devices to operate efficiently and optimally, either alone or on the wireless networks, it would be useful for the data associated with the device, its operation and applications, to be collected and reported, i.e., voice and/or data performance measurement. The set-up or configuration of these devices typically includes installing or adjusting various hardware, software and/or firmware and other associated parameters on the wireless device. Further, the set-up, or configuration is typically analyzed by running the voice and/or data performance tests on the wireless device to measure the performance and/or operability of the wireless device on the wireless network. Each type of wireless device may have its own device-specific set-up, and each wireless network and/or carrier may also have their network-specific and/or carrier-specific set-ups. Thus, the initial set-up and configuration of a wireless device for operation on a given wireless network is typically very complicated and time consuming. However, once the device is in operation, i.e., in use by the commercial/private owner, the actual performance data, such as set-up time, throughput, etc., is largely unknown to the network carrier, regarding that specific device.

Another complicating factor in understanding and tracking of device performance measurement is that typically external testing devices are required. For example, in a wireless device such as a cellular phone, various analyzers are serially connected to the phone and input and/or measure various parameters. In order to maximize throughput, such testing is typically performed in a batch mode on a plurality of wireless devices, resulting in a confusing mass of external testing devices, cables and wireless devices. Further, typically such measurements involve mobile testing, such as driving the cellular phone around a predetermined area to test its receive and transmit capabilities in varying environmental conditions. For example, with a cellular phone, these tests involve an exchange of messaging communications between a base station and the cellular phone. These mobile pre-operation measurements can be very inefficient and may only occur in a testing mode prior to device operation in actual use. Further, the external cabling and testing devices may have electromagnetic interactions with the transmit and receive functions of the wireless device, thereby producing inaccurate results.

Accordingly, it would be advantageous to provide an apparatus and method that allows for efficient, comprehensive collection and reporting of wireless device voice and/or data processing performance.

BRIEF SUMMARY

The described embodiments comprise apparatus, methods, processors and computer readable media for voice and/or data processing performance measurement, collection and reporting on a wireless device.

In one embodiment, for example, an apparatus for determining at least one of a voice processing and data processing performance of a wireless device comprises a performance module operable to generate and transmit a data collection configuration executable by a wireless device. The data collection configuration defines types of performance data to retrieve from a computer platform of the wireless device. Further, at least one of a voice processing characteristic and a data processing characteristic of the wireless device is definable based on the performance data. The apparatus also comprises a data repository operable to receive and store the performance data collected from the computer platform of the wireless device.

In another embodiment, an apparatus for determining at least one of voice processing performance and data processing performance of a wireless device comprises a generator means for generating and transmitting a data collection configuration across a wireless network to a wireless device. The data collection configuration defines types of performance data to retrieve from a computer platform of the wireless device. Further, at least one of a voice processing characteristic and a data processing characteristic of the wireless device is definable based on the performance data. The apparatus also comprises a storing means for receiving and storing the performance data collected from the computer platform of the wireless device. Additionally, the apparatus comprises an analysis means for analyzing the collected performance data and generating a performance report having at least one voice processing characteristic or at least one data processing characteristic of the wireless device based on the collected performance data.

In yet another embodiment, a wireless device comprises a computer platform having a processing engine operable to generate a plurality of performance data during at least one of voice processing and data processing activities on the wireless device. The wireless device also comprises a performance module operable to collect selected ones of the plurality of performance data associated with at least one of a predetermined voice processing capability and a data processing capability of the wireless device, wherein the selected ones of the plurality of performance data are based on a received data collection configuration.

In a further embodiment, a wireless device comprises a processing means for generating a plurality of performance data during at least one of voice processing and data processing activities on the wireless device. The wireless device also comprises a means for collecting selected ones of the plurality of performance data associated with at least one of a predetermined voice processing capability and a data processing capability of the wireless device. The selected ones of the plurality of performance data are based on a data collection configuration received from across a wireless network. Further, the wireless device comprises a means for selectively transmitting the collected selected ones of the plurality of performance data across the wireless network In still another embodiment, a method of determining at least one of a voice processing performance and a data processing performance of a wireless device comprises receiving performance data from across a wireless network, where the received performance data are based on a predetermined data collection configuration and further based on an operation of the wireless device. The method further comprises analyzing the collected performance data to determine at least one of a voice processing characteristic and a data processing characteristic of the wireless device.

A further embodiment includes a computer program resident in a computer readable medium that, when executed, directs a computer device to perform the actions of determining a data collection configuration which comprises selecting one performance data from a plurality of performance data associated with a processing engine on a computer platform of the wireless device, and dictating to the wireless device when to collect the selected performance data and when to transmit the collected performance data across the wireless network The computer program further directs the computer device to perform the action of transmitting the data collection configuration to the wireless from across the wireless network. Further included is the action of receiving performance data from the operation of the wireless device from across the wireless network, where the received performance data are based on the data collection configuration. Additionally, the computer program further directs the computer device to perform the action of analyzing the collected performance data to determine at least one of a voice processing characteristic and a data processing characteristic of the wireless device. Similarly, in another embodiment, at least one processor is configured to perform the above-stated actions.

In another embodiment, a method of determining at least one of a voice processing performance and a data processing performance of a wireless device comprises collecting predetermined ones of a plurality of performance data from a processing engine of the wireless device based on a data collection configuration. The predetermined performance data are associated with at least one of a voice processing characteristic and a data processing characteristic of the wireless device. The method further comprises selectively transmitting the collected performance data across a wireless network.

In a further embodiment, a computer program is resident in a computer readable medium that, when executed, directs a wireless device to perform the actions of receiving a data collection configuration from across a wireless network. The data collection configuration identifies at least one of a plurality of performance data to collect from a processing engine of the wireless device, where the identified performance data are associated with at least one of a predetermined voice processing characteristic and a data processing characteristic of the wireless device. Further, the computer program directs the wireless device to perform the actions of collecting the identified performance data based on the received data collection configuration, and selectively transmitting the collected performance data across the wireless network. Similarly, in another embodiment, at least one processor is configured to perform the above-stated actions.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

Figure 1:
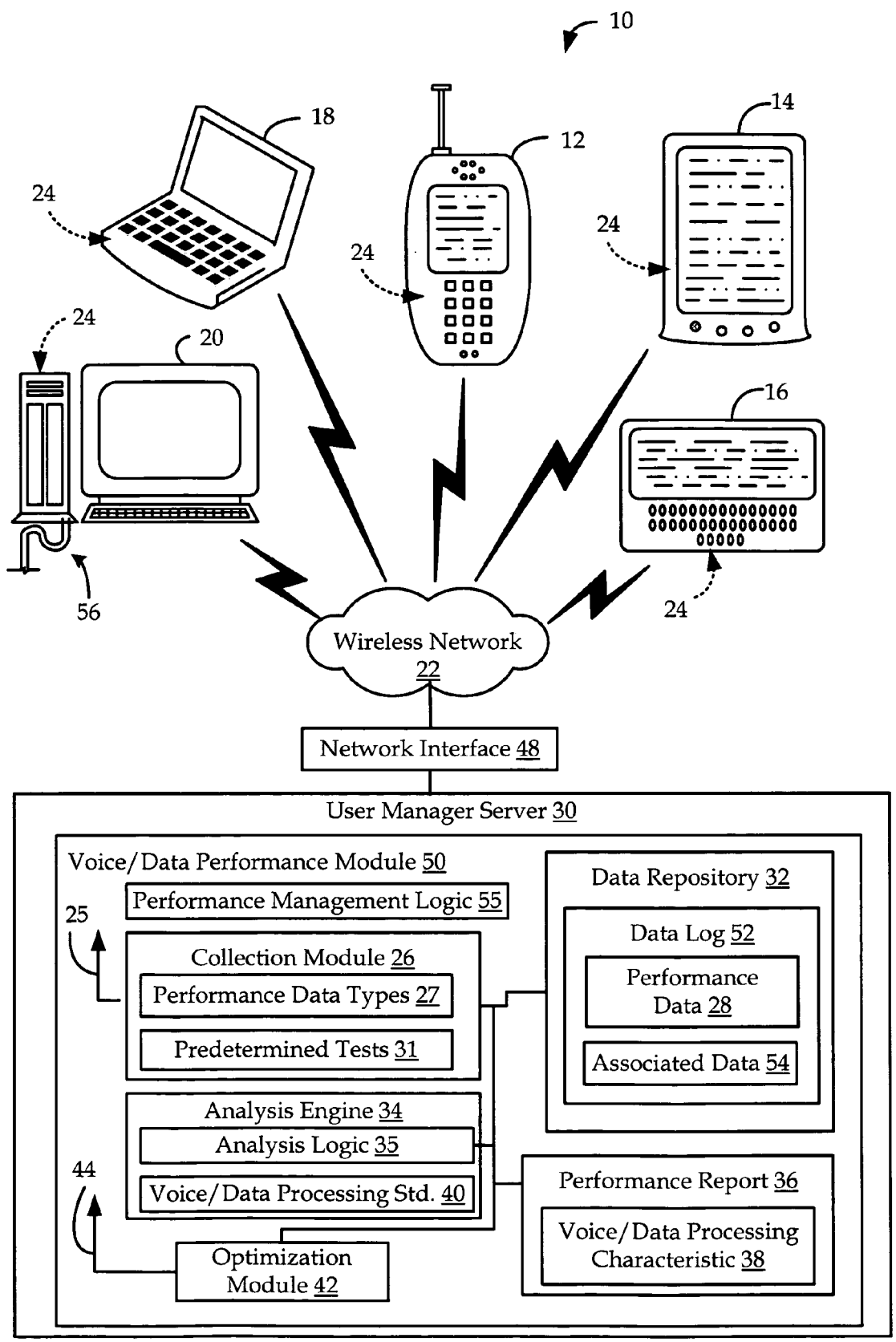
FIG. 1 is a representative diagram of one embodiment of an apparatus for determining a voice and/or data processing performance or capability of a wireless device.
Figure 2:
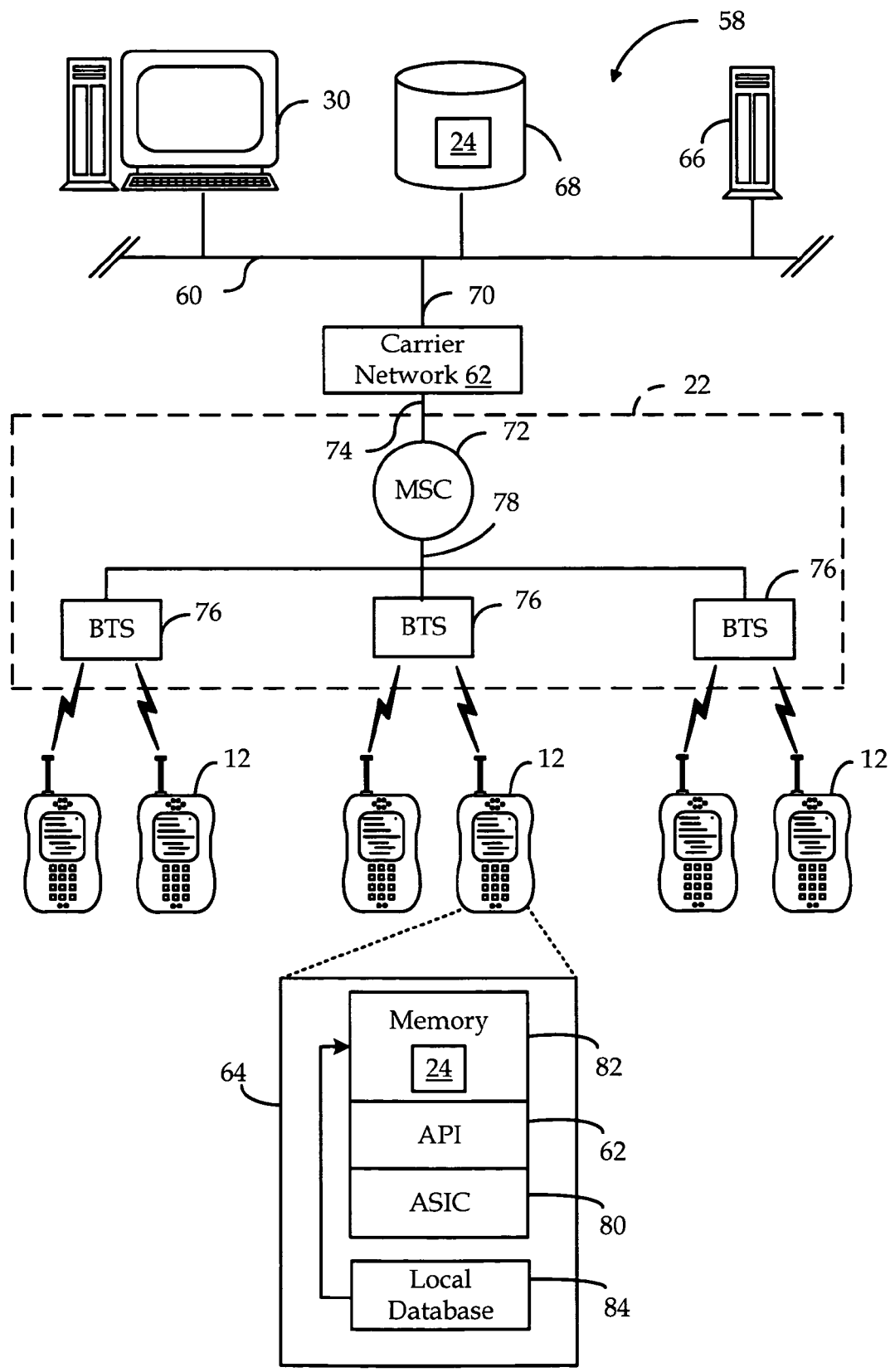
FIG. 2 is a schematic diagram of one embodiment of a cellular telephone network embodiment of the apparatus of FIG. 1, including one embodiment of a computer platform of the wireless device of FIG. 1.
Figure 3:
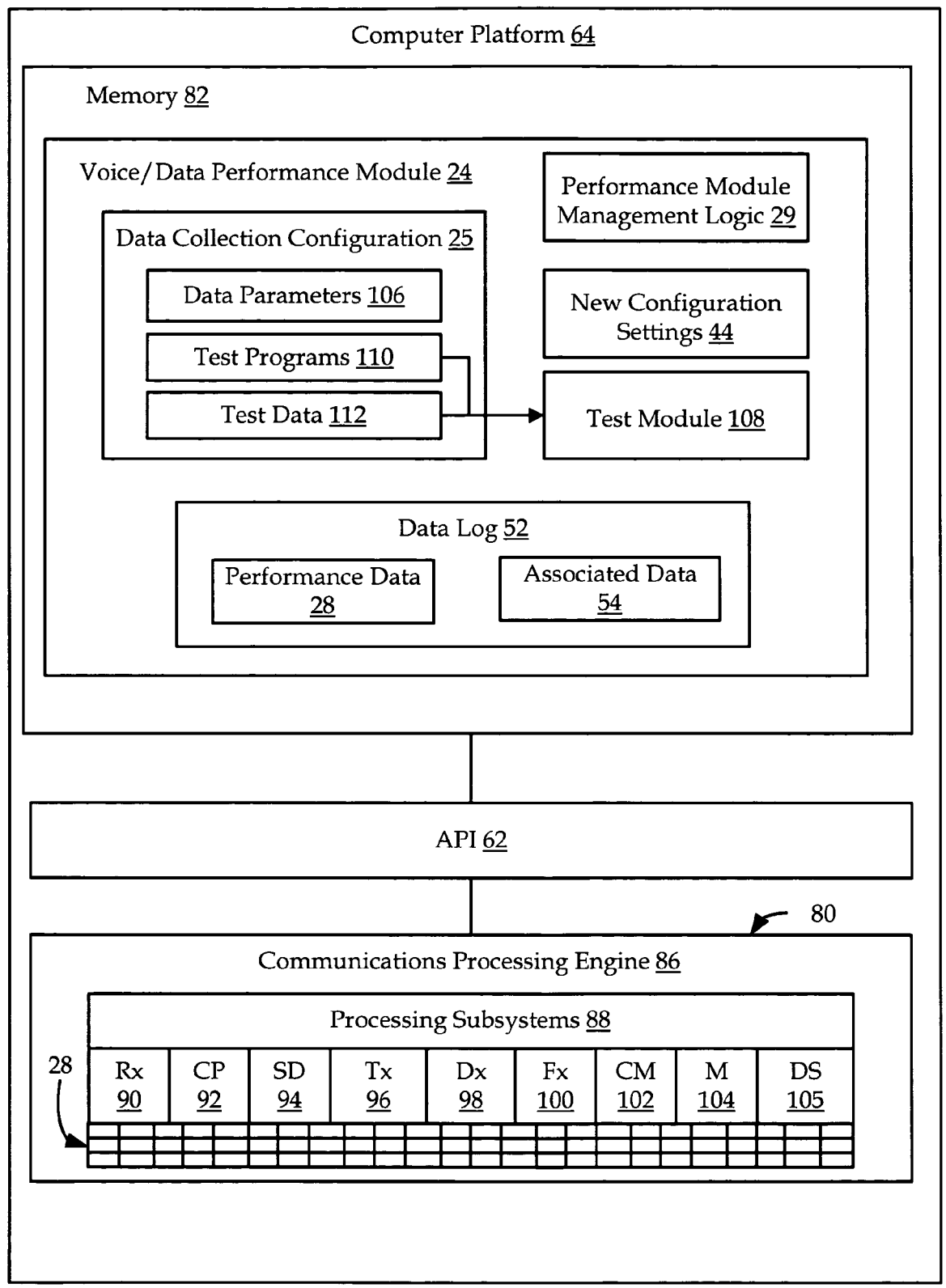
FIG. 3 is one embodiment of an architecture diagram of the interaction between a voice and/or data performance module and a communications processing engine of the wireless device of FIG. 1.

Referring to FIGS. 1-3, one embodiment of a system 10 for collecting processing-related data and analyzing the voice and/or data processing capabilities of any one of a plurality of wireless devices 12,14,16,18,20 in communication with a wireless network 22 includes a resident voice/data performance module 24 on each device. Each resident voice/data performance module 24 is operable, according to a collection configuration 25 defined by a remotely-located collection module 26, to collect and transmit selected ones of a plurality of types of performance data 27 across a wireless network 22 to a user manager server 30. For example, collection module 26 dictates what types of performance data to collect and when to gather the data, along with when to upload the actual, collected performance data 28 to user manager 30. Further, collection module 26 may dictate one of a plurality of predetermined tests 31 to perform on the respective wireless device 12,14,16,18,20 in order to generate the predetermined performance data 28. User manager 30 stores the transmitted performance data 28 in a data repository 32, which is accessible by an analysis engine 34. Analysis engine 34 examines the collected performance data 28 and generates a performance report 36, which characterizes the actual voice and/or data processing characteristics 38 associated with the respective device 12,14,16,18,20 based on the collected performance data 28. For example, the analysis performed by analysis engine 34 may compare select portions of performance data 28 with select portions of a predetermined voice and/or data processing standard 40 to determine whether or not the performance data falls within the standards. Further, after performing an initial analysis on an initial set of performance data 28, analysis engine 34 may initiate further communications through collection module 26 with one or more wireless devices 12,14,16,18,20 to retrieve additional data related to performance data 28, and/or to retrieve more performance data, based on a new collection configuration 25 based on the analysis, in order to provide further analysis and reporting. Analysis engine 34 may repeat such a feedback loop until a predetermined solution is achieved, i.e. until a set number of tests are run and the results confirmed. Optionally, user manager 30 may include an optimization module 42 that analyzes each respective performance report 36, for example by applying an optimization algorithm, and generates new device/network processing configuration settings 44 for a respective wireless device or for a network component to improve the voice and/or data processing capability of interest. User manager 30 may then transfer the updated device/network processing configuration settings 44 to the respective wireless device and/or network component in order to improve the voice and/or data processing performance capabilities associated with system 10. Thus, the present apparatus and methods provide for the collection, analysis and reporting of predetermined performance data 28 associated with the voice and/or data processing capabilities of a wireless device, and allow for troubleshooting and optimization of voice and/or data processing-related device configurations in order to improve the voice and/or data processing capabilities of the respective wireless device.

Performance data 28 can include any type of data associated with a voice and/or data processing activity on a wireless device 12,14,16,18,20. Performance data 28 includes, but is not limited to: information on the applications that make the voice and/or data calls; application level protocol data and statistics, e.g., File Transfer Protocol (hereinafter "FTP") data, browser protocol data, transmission control protocol ("TCP") data, Internet protocol ("IP") data, hypertext transfer protocol ("HTTP") data, user datagram protocol ("UDP") data, Internet Control Message Protocol ("ICMP") data, etc.; data link layer protocol data and statistics, such as Point-to-Point Protocol ("PPP") information; Radio Link Protocol (hereinafter "RLP") level statistics; instant messaging protocol statistics and information, such as real time protocol ("RTP"); radio frequency ("RF") information; other information relating to troubleshooting and utilities, such as a ping utility; and other data and information discussed below in more detail.

Voice/data performance module 24 may be initiated at any time, and performance data 28 may be stored on the respective wireless device 12,14,16,18,20 and obtained at any time via a wired or wireless connection to the respective wireless device. Voice/data performance module 24 may include any hardware, software, firmware and/or other set of executable instructions operable to manage the collection on the wireless device, and transmission across the wireless network, of any information relating to the voice and/or data processing capabilities of the respective wireless device. Voice/data performance module 24 collects any voice and/or data processing-related performance data 28, including but not limited to, over-the-air ("OTA") messages and wireless device data values and statistics relating to the processing of voice, text, video, applications, audio, multi-media, etc. Additionally, voice/data performance module 24 may collect associated data 54 relevant to performance data 28, including, for example, processing-related information on the specific data applications that were used, the duration of use, radio frequency ("RF") information, position/location system information, what network resources were allocated, etc. Further, voice and/or data processing-related performance data 28 correspond to or are associated with voice and/or data processing characteristic 38 of the respective device. As such, performance data 28 and/or processing characteristic 38 may further include, for example, voice processing performance-related information such as signal strength, frame error rate, latency, fading, signal-to-noise ratio, signal pollution from other communications devices, any information relating to how quickly a communications signal is acquired and how quickly a voice call is established, and any information relating to a measure of the voice quality. Similarly, performance data 28 and/or processing characteristic 38 may further include, for example, data processing performance-related information such as overall data throughput of the respective device, data throughput measurements of one or more components of the respective device, a measure of the number of data re-transmissions, frame error rate, latency (such as in video conferencing applications), etc. It should be noted that the same or similar performance data 28 and/or performance characteristics 38 may be used for determining both voice performance and data performance. Further, voice/data performance module 24 may store the collected performance data 28 and/or associated data 54 in a data log 52, either in a resident memory or another memory device connectable to the respective wireless device. In one embodiment, for example, voice/data performance module 24 comprises performance module management logic 29, which includes executable instructions for managing the receiving and executing of configuration 25, the collecting and storing of performance data 28 and/or associated data 54, and providing access to or forwarding log 52 and/or its contents for further analysis. Thus, in one embodiment, voice/data performance module 24 provides each wireless device 12,14,16,18,20 with a resident or self-contained capability for retrieving and recording actual performance data 28 associated with voice and/or data processing activities on a wireless device, as well as for allowing the transmission and remote analysis of such performance data.

Voice/data performance module 24 may cause the respective wireless device to selectively transmit performance data 28, such as data service information, and/or associated data 54 for that wireless device to another computer device, such as user manager 30, on the wireless network. In one embodiment, voice/data performance module 24 transmits performance data 28 and/or associated data 54 from that wireless device 12,14,16,18,20 to user manager 30 across the wireless network 22 when requested. Alternately, performance data 28 and/or associated data 54 is transmitted over an open communication connection from the wireless device 12,14,16,18, 20 to the wireless network 22, and thus "piggybacked" across an open connection, such as a voice or data call at the cellular telephone 12. In a cellular network configuration, performance data 28 and/or associated data 54 can be transmitted to user manager 30, for example, through short message service ("SMS"), HTTP/TCP, and automatic call back ("ACB"). In another embodiment, a remote user manager 30 reads performance data 28 and/or associated data 54 from the respective device through the resident voice/data performance module 24, and in some instances, writes commands, such as new processing configuration settings 44, to computer platform 64 and alters the operation of the wireless device 12,14,16,18,20. Accordingly, the access to voice/data performance module 24 allows the user manager 30 to remotely control parameters for data collection, and analyze and report specific device data and/or voice operational information.

User manager 30 may communicate with wireless devices 12,14,16,18,20 through a direct, wired connection or through a wireless connection, such as through a network interface 48 in communication with wireless network 22. The communications between user manager 30 and wireless devices 12,14,

16,18,20 may include downloads of all, or selected portions (such as agents and data sets), of a voice/data performance module 50 that form and/or operate within voice/data performance module 24 resident on the respective device. Other such communications include uploads from each wireless device 12,14,16,18,20 back to the user manager 30, such as uploads of performance data 28 and/or associated data 54. User manager 30 may be at least one of any type of server, personal computer, mini-mainframe and the like. Further, there can be separate servers or computer devices associated with user manager 30 that work in concert to provide data in usable formats to parties, and/or a separate layer of control in the data flow between the wireless devices 12,14,16,18,20 and user manager 30.

User manager 30 includes voice/data performance module 50, which may be software, hardware, firmware and generally any executable instructions operable by analysis engine 34. Voice/data performance module 50 is executable by user manager 30 to manage the collection and analysis of data logs 52 from wireless devices 12,14,16,18,20. In one embodiment, for example, voice/data performance module 50 comprises performance management logic 55, which includes executable instructions for managing the generation and transmission of configuration 62, the receipt and storage of performance data 28 and/or associated data 54, and initiating the analysis and optimization described herein. For example, voice/data performance module 50 includes collection module 26 that is operable to define collection configuration 25, which is transmitted to the respective wireless device. Collection configuration 25 is executable by the respective device to collect predetermined voice and/or data processing related information, i.e. performance data 28 and/or associated data 54. Examples of associated data 54 include, for example, device identification, such as a phone number, a mobile directory number ("MDN"), an electronic serial number ("ESN"), an international mobile equipment identity ("IMEI"), etc., timestamps, corresponding application information, corresponding protocol information, RF information, position/location system information, and other subsystem information related to performance data 28. This information is stored in data logs 52. Voice/data performance module 50 may "pull" the logs 52 based on commands from a user, or the logs may be "pushed" from the respective devices at predetermined times or upon reaching predetermined memory/data storage levels.

User manager 30 and/or voice/data performance module 50, utilizes data log 52 for analyzing and reporting the voice and/or data processing performance of the respective device, including but not limited to: voice call application performance, data call application performance, voice over internet protocol ("VoIP") application performance, text messaging application performance, video application performance, multimedia application performance, IP services performance, protocol processing performance, troubleshooting diagnosis, and configuration evaluation. User manager 30 and its corresponding components can give a ready view of performance data 28 collected from the wireless devices in any form, such as tables, maps, graphics views, plain text, interactive programs or web pages, or any other display or presentation of the data. For example, user manager 30 may present performance data 28 and/or performance report 36 on a monitor or display device, and/or may transmit, such as via electronic mail, this information to another computer device for further analysis or review. Also, user manager 30 may change an operational parameter and/or configuration of a respective wireless device, and/or of a network component, based on the actual performance data 28 and/or based on the results of analysis engine 34.

Analysis engine 34 may include hardware, software, firmware, and combinations thereof for analyzing and processing performance data 28. Additionally, in one embodiment, analysis engine 34 may further comprise analysis logic 35 which may include algorithms, decision-making routines, statistical programs, etc. for analyzing and interpreting performance data 28. For example, analysis engine 34 may include programs for determining access successes and failures, as disclosed in U.S. patent application Ser. No. 11/078,235, filed Mar. 11, 2005, entitled "APPARATUS AND METHODS FOR DETERMINING CONNECTION QUALITY OF A WIRELESS DEVICE ON A WIRELESS COMMUNICATIONS NETWORK," assigned to the present assignee and hereby incorporated by reference. In another example, analysis engine 34 may include programs for determining position/location information associated with voice/data calls, as disclosed in U.S. patent application Ser. No. 11/139,301, filed May 27, 2005, entitled "APPARATUS AND METHODS FOR ASSOCIATING A GEOGRAPHICAL POSITION WITH AN EVENT OCCURING ON A WIRELESS DEVICE," assigned to the present assignee and hereby incorporated by reference. Although illustrated as being associated with user manager 30, analysis engine 34 may be located anywhere in communication with wireless network 22, such as on user manager 30, another server connected to the network, or on a respective wireless device 12,14,16,18,20.

As noted above, analysis engine 34 outputs performance report 36, which in one embodiment may be details of performance data 28 that are reviewed manually, such as by a technician or field engineer, for evaluation of voice and/or data processing operation-related issues associated with a particular wireless device. In this case, the technician or field engineer, instead of or in cooperation with optimization module 42, may generate new voice and/or data processing configuration settings 44 for the respective wireless device 12,14, 16,18,20 based on the collected performance data Generally, report 36 may be useful in trouble-shooting device operation data-related issues and identifying problem areas and/or devices, such as through analysis of data log 52 and the collected performance data 28. As such, performance report 36 includes any form of output that represents analysis of performance data 28, as well as any other associated data 54 such as network data and wireless device data, associated with the data log 52 of one or more respective wireless devices.

Additionally, as mentioned above, optimization module 42 may access performance data 28 directly from either performance report 36 or analysis engine 34 and apply predetermined algorithms or programs to optimize the settings of one or more device- and/or network-related configurations to improve the voice and/or data processing performance, such as connection quality, video/image acquisition, etc. Optimization module 42 may include any hardware, software, firmware and/or other set of executable instructions operable to analyze performance data and determine revised network-specific and/or wireless device-specific configuration changes to improve device performance in and of itself or performance on the network. Additionally, optimization module 42 may be operable to initiate further communications with a respective wireless device 12,14,16,18,20 and/or a network component, such as a base station, to retrieve additional communications-related data associated with the data log 52, in order to perform further analysis and optimization. The optimizations performed by optimization module 42 may also be performed all or in part by a technician manually reviewing the data log 52 or voice and/or data performance report 36, and any associated performance-related data.

Wireless network 22 includes any communications network operable, at least in part, for enabling wireless communications between a respective wireless device 12,14,16,18, 20 and any other device connected to wireless network 22. Further, wireless network 22 may include all network components, and all connected devices that form the network. For example, wireless network 22 may include at least one, or any combination, of: a cellular telephone network; a terrestrial telephone network; a satellite telephone network; an infrared network such as an Infrared Data Association ("IrDA")-based network; a short-range wireless network; a Bluetooth® technology network; a ZigBee® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and a 802.11 network; a public switched telephone network; a public heterogeneous communications network, such as the Internet; a private communications network; and land mobile radio network. Suitable examples of telephone networks include at least one, or any combination, of analog and digital networks/technologies, such as: Personal Communications Services ("PCS"), code division multiple access ("CDMA"), wideband code division multiple access ("WCDMA"), universal mobile telecommunications system ("UMTS"), advanced mobile phone service ("AMPS"), time division multiple access ("TDMA"), frequency division multiple access ("FDMA"), orthogonal frequency division multiple access ("OFDMA"), global system for mobile communication ("GSM"), single carrier ("1X") radio transmission technology ("RTT"), evolution data only ("EV-DO") technology, general packet radio service ("GPRS"), enhanced data GSM environment ("EDGE"), high speed downlink data packet access ("HSPDA"), analog and digital satellite systems, and any other technologies/protocols that may be used in at least one of a wireless communications network and a data communications network.

Network interface 48 may be any mechanism that allows user manager 30 to communicate across wireless network 22. For example, network interface 48 may include a local area network that connects user manager 30 through an Internet Service Provider to the Internet, which in turn may be connected to a respective wireless device through a carrier network and a base station.

Wireless devices 12,14,16,18,20 can include any type of computerized, wireless devices, such as cellular telephone 12, personal digital assistant 14, two-way text pager 16, portable computer 18 and even a separate computer platform 20 that has a wireless communication portal, and which also may have a wired connection 56 to a network or the Internet. The wireless device can be a remote-slave, or other device that does not have an end-user thereof but simply communicates data across the wireless network 22, such as remote sensors, diagnostic tools, data relays, and the like. The apparatus and method of voice and/or data performance measurement, collecting and reporting on the wireless device can accordingly be performed on any form of wireless device or computer module, including a wired or wireless communication portal, including without limitation, wireless modems, PCMCIA cards, access terminals, personal computers, telephones, or any combination or sub-combination thereof.

In a cellular telephone embodiment, for example referring to FIG. 2, a cellular telephone system 58 may include wireless network 22 connected to a wired network 60 via a carrier network 62. The use of cellular telecommunication pathways has been increasing because wireless devices, such as the plurality of cellular telephones 12 illustrated in FIG. 2, are being manufactured with increased computing capabilities and are becoming tantamount to personal computers and hand-held personal digital assistants ("PDAs"), communicating packets including voice and data over wireless network 22. These "smart" cellular telephones 12 have installed application programming interfaces ("APIs") 62 onto their local computer platform 64 that allow software developers to create software applications that operate on the cellular telephone, and control certain functionality on the device. FIG. 2 is a representative diagram that more fully illustrates the components of a cellular wireless network and interrelation of the elements of one embodiment of the present system. Cellular wireless network 58 is merely exemplary and can include any system whereby remote modules, such as wireless devices 12,14,16,18,20, communicate over-the-air between and among each other and/or between and among components of a wireless network 22, including, without limitation, wireless network carriers and/or servers.

In system 58, user manager 30 can be in communication over a LAN network 60 with a separate data repository 66 for storing performance data 28 gathered from the remote wireless devices 12,14,16,18,20, such as the respective data logs 52. Further, a data management server 66 may be in communication with user manager 30 to provide post-processing capabilities, data flow control, etc. User manager 30, data repository 68 and data management server 66 may be present on the cellular network 58 with any other network components that are needed to provide cellular telecommunication services. User manager 30, and/or data management server 66 communicate with carrier network 62 through a data link 70, such as the Internet, a secure LAN, WAN, or other network. Carrier network 62 controls messages (generally being data packets) sent to a mobile switching center ("MSC") 72. Further, carrier network 62 communicates with MSC 72 by a network 72, such as the Internet, and/or POTS ("plain old telephone service"). Typically, in network 74, a network or Internet portion transfers data, and the POTS portion transfers voice information. MSC 72 may be connected to multiple base stations ("BTS") 76 by another network 78, such as a data network and/or Internet portion for data transfer and a POTS portion for voice information. BTS 76 ultimately broadcasts messages wirelessly to the wireless devices, such as cellular telephones 12, by short messaging service ("SMS"), or other over-the-air methods.

Referring to FIG. 2, each wireless device, such as cellular telephone 12 in this case, has computer platform 64 that can transmit data across wireless network 22, and that can receive and execute software applications and display data transmitted from user manager 30 or another computer device connected to wireless network 22. Computer platform 64 also includes an application-specific integrated circuit ("ASIC") 80, or other chipset, processor, logic circuit, or other data processing device. ASIC 80 or other processor may execute an application programming interface ("API") layer 62 that interfaces with any resident programs, such as voice/data performance module 24, in a memory 82 of the wireless device. API 62 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices. Memory 82 may include read-only and/or random-access memory (RAM and ROM), EPROM, EEPROM, flash cards, or any memory common to computer platforms. Computer platform 64 also includes a local database 84 that can hold the software applications, files, or data not actively used in memory 82, such as the software applications or data downloaded from user manager 30. Local database 84 typically includes one or more flash memory cells, but can be any secondary or tertiary storage device, such as magnetic media, EPROM, EEPROM, optical media, tape, or soft or hard disk. Additionally, local database 84 can ultimately hold a resident copy of voice/data performance module 24 or agent, as is further described herein.

Referring to FIG. 3, in one embodiment, computer platform 64 includes voice/data performance module 24 that interfaces with API 62 and is executable by a communications processing engine 86. Communications processing engine 86 includes various processing subsystems 88 embodied in hardware, firmware, software, and combinations thereof, that enable the functionality of the respective wireless device 12,14,16,18,20 and the operability of the respective device on wireless network 22, such as for connecting with the network, exchanging data/communications with other devices, etc. For example, communications processing engine 86 may include, one or a combination of processing subsystems 88, such as: sound, non-volatile memory, file system, transmit, receive, searcher, physical layer, link layer, call processing layer, main control, remote procedure, music, audio, handset, power management, diagnostic, digital signal processor, vocoder, messaging, call manager, Bluetooth®, Bluetooth® LPOS, position determination, position engine, user interface, sleep, data services, security, authentication, USIM/SIM, voice services, graphics, USB, video services, camera/camcorder interface and associated display drivers, multimedia such as MPEG, GPRS, etc., along with other functionality applications. In one embodiment, API 62 includes a class of software extensions that allow voice/data performance module 24 to access communications processing engine 86. These software extensions can communicate with processing subsystems 88 on the wireless device, which allows both data reads and commands. For example, this software extension can send commands, including register for log messages, on behalf of the applications that invoke it. The module can then forward the responses of the subsystems to voice/data performance module 24, or ultimately across wireless network 22 to user manager 30. Each resident application on wireless device can create an instance of this new software extension to communicate with the subsystems independently.

It should be noted that the subsystems can include any data or data service operable on a wireless device, which embody the device's operational functionality.

In one embodiment, such as a cellular telephone 12, processing subsystems 88 include one or more of a receive ("Rx") component 90 for receiving communications sent to the processor of the wireless device, a call processing ("CP") component 92 and/or system determination ("SD") component 94 for handling the initiation, authentication, handoffs, data exchanges, messaging protocols, internal processing and decision-making, etc. associated with processing a message, and a transmit ("Tx") component 96 for sending communications from the processor of the wireless device, such as to handset components, wireless network 22, wireless network components, and other devices connected to the wireless network. In this embodiment, CP component 92 may handle the majority of the call processing tasks, while SD component 94 may handle tasks relating to selecting an appropriate system, from a plurality of systems, with which to communicate, as well as higher-level decision-making tasks referenced by CP component 92. In addition, processing subsystems 88 may further include one or more of a diagnostic ("Dx") component 98 for evaluating a subsystem, a fax ("Fx") component 100 for handling facsimile communications, a call manager ("CM") 102 component for characterizing and logging call types, a messaging component ("M") 104 for text sending and receiving, and a data services ("DS") component 105 for processing all data-related communications, such as establishing and maintaining data calls.

Data collection configuration 25 includes data parameters 106 that define conditions and types of information to collect as performance data 28 and associated data 54, including when to collect the data, and when to transmit data log 52 across wireless network 22 to user manager 30 and/or another computer device. As mentioned above, in one embodiment, data collection configuration 25 is generated by voice/data performance module 50 on user manager 30. It should be noted, however, that data collection configuration 25 may be generated by any computer device connected to wireless network 22, or may be locally transmitted to the respective wireless device 12,14,16,18,20, such as by a manual input from a user, through a short-range radio technology such as Bluetooth® technology, and/or through transmission from a locally-connected media reader.

For example, as defined by data collection configuration 25, performance data 28 includes call data, such as call initiation information, session information, call termination information and socket information. Call initiation information includes, but is not limited to: application related information, (such as ID, version and security level), service option, mobile origination/termination, service negotiation, network state (e.g., dormant, disconnected), etc. Session information includes, but is not limited to: protocol in use (e.g., CDMA, 1X, EV-DO, GSM, UMTS, GPRS, EDGE, HSDPA, etc.), other protocol related parameters (e.g. PDP in UMTS), mobile IP, session initiation protocol, (e.g., registration-related information), etc. Call termination information includes, but is not limited to: termination cause, IP address (e.g., requested/granted), time (e.g., active/dormant), etc. Socket information includes, but is not limited to: type created, header information (e.g., destination, application), statistic information (e.g., reset, retransmissions, packet/byte received/sent, number of concurrent socket), etc.

In terms of RLP level statistics, for example, performance data 28 that may be collected include, but are not limited to: records of establish attempts and established, sync time/round trip time, frame/byte count for received/sent, erasures (errors) received, negative acknowledgements received/sent, retransmission, idle, fill, other frame counts for received/sent, largest continuous erasure (longest fading), reset count and abort count. These statistics may be refreshed with the start of each RLP session. Further, these statistics may be reported from one of communications processing subsystems, such as "Data Services" in a CDMA protocol system.

In terms of HTTP, for example, performance data 28 include, but are not limited to, the following: application ID for request/response, HTTP request response status code, and request/response size, etc.

For ICMP, for example, performance data 28 include, but are not limited to, the following: messages, errors, destination unreachable, echos, echo replies, time exceeded, etc.

For IP, for example, performance data 28 include, but are not limited to, the following: packets received, received header/address errors, received packets discarded/delivered, reassembly required, and fragments created, etc.

For TCP, for example, performance data 28 include, but are not limited to, the following: active/passive opens, failed connection attempts, reset connections, current connections, segments received, segments sent, and segments retransmitted, events such as synch time, etc.

For UDP, for example, performance data 28 include, but are not limited to, the following: datagrams received, number of ports, received errors and datagrams sent, etc.

For PPP, for example, performance data 28 include, but are not limited to, the following: sync time, frame-byte count, etc.

For applications, such as the "Ping" tool in the internet control message protocol ("ICMP"), performance data 28 include, but are not limited to, information relating to whether or not a host is reachable, how long packets take to get to and from that host, round-trip time, etc. For an application layer protocol, such as the file transfer protocol ("FTP"), performance data 28 includes, but is not limited to, data throughput.

Additionally, voice/data performance module 24 may include a test module 108 operable to test the voice and/or data processing capabilities of any functionality of the respective wireless device. For example, test module 108 may include various test programs 110 and test data 112 to be processed via the test programs. User manager 30 may transmit the various test programs 110 and/or test data 112 to voice/data performance module 24 via data collection configuration 25. Alternatively, test programs 110 and/or test data 112 may already be loaded on the respective wireless device, and user manager 30 may transmit a command to the device to execute a selected test program or test data. Test module 108 may utilize test programs 110 and/or test data 112 to carry out real-time operations on the respective device using wireless network resources. Alternatively, test module 108 may utilize test programs 110 and/or test data 112 to locally simulate predetermined operations without the use of the wireless network resources. For example, test programs 110 and/or test data 112 may include messages typically generated by a base station of a wireless network. As such, test module 108 may simulate actions of a network component by supplying these predetermined messages and data to a receive component of the respective wireless device, and then monitoring the processing of the simulated input and the resulting output from the device, while logging performance data 28 based on configuration 25.

In one embodiment, for example, voice/data performance module 24 may implement test module 108 to execute a test program 10, such as an FTP simulation, which can be used in a script as an automation test to determine a throughput measurement. In another example, voice/data performance module 24 may implement test module 108 to execute test program 110 to test forward and reverse file transfer. For example, in one embodiment, test module 108 may use the BREWS IWeb interface for forward transfer and the BREW® ISocket interface for reverse file transfer, although the described embodiments are not limited to using the BREW® system. In yet another example, voice/data performance module 24 may implement test module 108 to execute test program 110 to test conveying information via a predetermined protocol. For example, in one embodiment, test module 108 may use the BREW® IWeb interface to implement and test hypertext transfer protocol ("HTTP") communications, such as in the forward mode. In this case, voice/data performance module 24 retrieves data whenever the data is available from the IWeb interface, and can also retrieve throughput information based on the data transferred from IWeb. In still another example, voice/data performance module 24 may implement test module 108 to execute test program 110 to test file transfer. For example, in one embodiment, test module 108 may use the BREW® ISocket interface to implement a transmission control protocol ("TCP") socket for file transfer (e.g. reverse mode). In this case, voice/data performance module 24 transmits test data 112 to user manager 30, and can also retrieve throughput information based on the data transferred from ISocket or any TCP/IP socket interface.

Additional examples of performance data 28 include, but not limited to: air interface data; handoff data; power control data; registration data; authentication data, service redirection data; short messaging service ("SMS") data; subscriber calling features data; asynchronous data and fax services; low-, medium- and high-speed packet data services; voice data; over-the-air services; system selection for preferred roaming; message driven indicators; forward compatibility; signaling; application interface data; field test data, and other non-enumerated performance data; etc.

Further, for example, the types of performance data 28 which are measured involve the operational performance of various functions, parameters, characteristics, messaging protocols, etc., such as: terminations, originations and maintenance in strong signal, weak signal and mixed signal environments; radio frequency ("RF") performance data, such as: receive (Rx) data, including sensitivity, isolated magnetic dipole ("IMD") and self-jamming, transmit (Tx) data, such as waveform quality ("Rho"), power control and maximum power, and broadband ("BB") and digital signal processing ("DSP") data, such as signal acquisition, soft handoff ("SHO"), searcher, and finger assignment; interoperability data, such as: channel data, including access channel ("ACH"), dedicated paging channel ("DPCH"), forward traffic channel ("FTCH") and reverse traffic channel ("RTCH"), messaging data dealing with layer 1 and layer 2, and handoff parameters including SHO, interband hard handoff ("HHO") and interfrequency HHO. Further, for example, the measured data for the wireless device, such as system acquisition, high speed packet data ("HSPD"), location determination, call types (POTS, 3-way, call waiting, voice mail, authentication, etc.), provisioning (over-the-air service provisioning ("OTASP"), over-the-air parameter administration ("OTAPA"), IP over-the-air ("IOTA"), etc.), and other data dealing with features such as short message service ("SMS"), multimedia service ("MMS"), browser, Java® software and BREW® software.

Thus, in one embodiment, user manager 30 can "push" at least one voice/data performance module 24 to be resident, at least temporarily, on the computer platform 64 of each wireless device 12,14,16,18,20. For example, user manager 30 may "push" voice/data performance module 24 across wireless network 22 to the respective device. Alternately, voice/data performance module 24 can be placed on the platform 64 at the time of manufacture or initial programming, or the wireless device 12,14,16,18,20 can "pull" the application from another computer device on the network, such as user manager 30, either with a request from the end-user, or automatically. User manager 30 may then transmit data collection configuration 25 to voice/data performance module 24 to retrieve performance data 28. Performance data 28 can include, but is not limited to, network connection, voice, text, video, audio, multi-media, applications, messages, messaging protocols, and parameters, generated from communications processing engine 86 during the actual operation of wireless device. Performance data 28 can allow for the specific understanding of the operation of the individual device, along with troubleshooting of a device within the wireless network 22 based upon the gathered performance data. As mentioned above, voice/data performance module 24 or agent can be permanently stored in the local database 84 of the wireless device computer platform 64, or can only be temporarily held in memory 82 thereof for a one time (or n-time) execution to transmit performance data 28.

Figure 4:
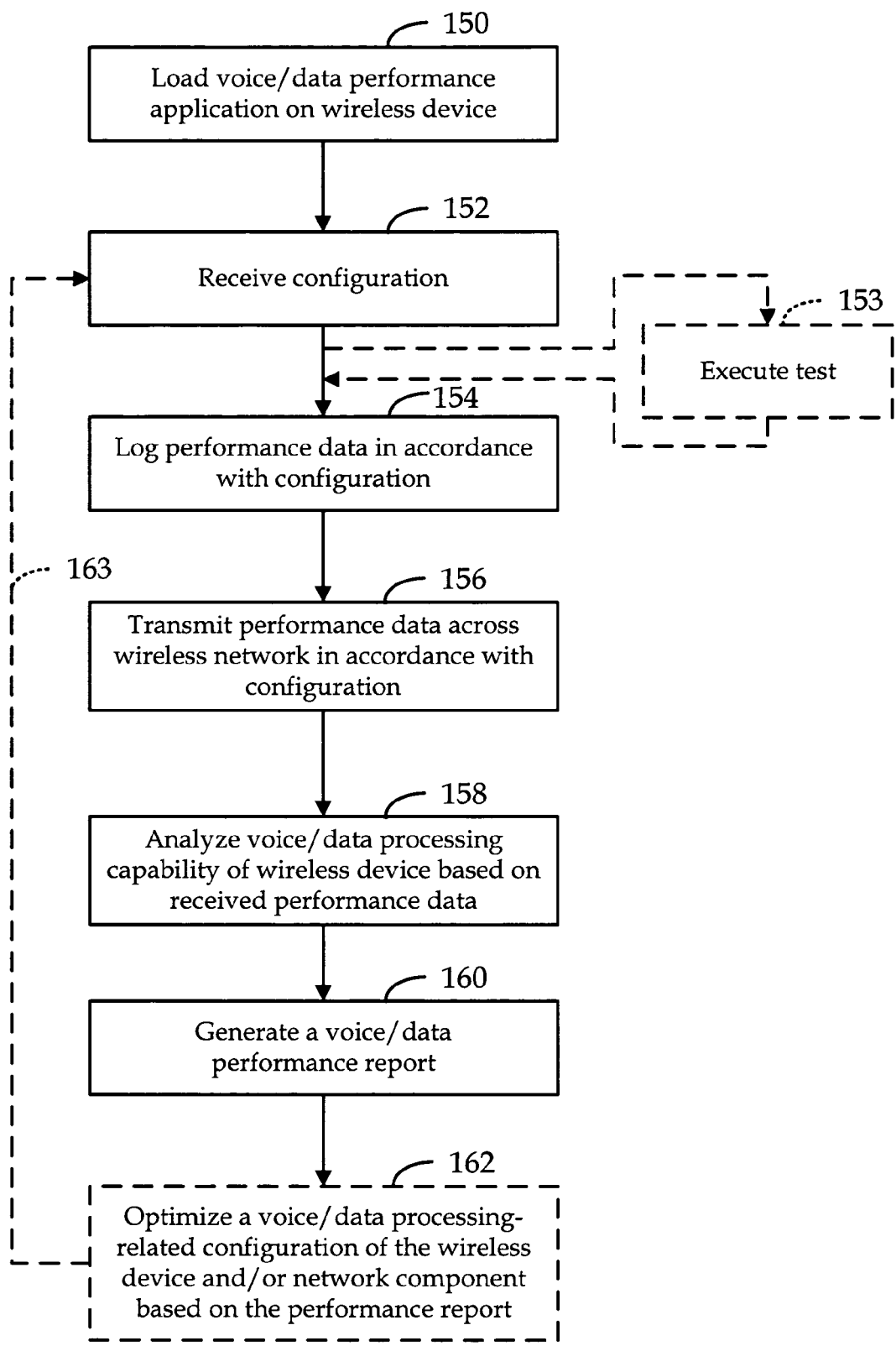
FIG. 4 is a flowchart of one embodiment of a method of determining voice and/or data processing performance of a wireless device.

In operation, referring to FIG. 4, one embodiment of a method for voice and/or data performance measurement on a wireless device includes loading at least a portion of a voice and/or data performance application onto a computer platform of the wireless device (Block 150). For example, the voice and/or data performance application may be embodied within the hardware and/or firmware of the wireless device during the manufacture of the device. Alternatively, the voice and/or data performance application may be "pushed" by a user manager to the wireless device, or "pulled" from a user manager by the wireless device, across a wireless network. In another alternative, the loading of the voice and/or data performance application may be configurable in any manner, for example, being initiated by a predetermined event, such as unacceptable voice and/or data processing characteristic.

Further, this embodiment of the method includes receiving a predetermined data collection configuration that defines the parameters associated with the collection of predetermined voice and/or data processing performance-related data (Block 152). For example, the respective wireless device may receive this configuration from a user manager 30 across a wireless network 22. Alternatively, the user of the wireless device may input this configuration directly into the device, such as through the device keypad. In one embodiment, this predetermined configuration is designed to collect performance data indicative of a predetermined voice and/or data processing characteristic 38 of the respective wireless device.

Optionally, the predetermined data collection configuration may include test programs 110 and/or test data 112 designed to test a predetermined voice and/or data characteristic. In this case, test module 108 executes test programs 110 and/or test data 112, thereby generating a predetermined test on the device (Block 153).

This embodiment of the method also includes retrieving performance data from a processing engine of the respective wireless device in accordance with the predetermined data collection configuration, and logging the performance data in a memory associated with the wireless device (Block 154). For example, performance data 28 and predetermined associated information/data 54 that are generated by communications processing engine 86 of the wireless device during its operation may be stored in data log 52 are collected based on the predetermined configuration and stored in memory 82 of the respective wireless device. Optionally, the logged performance data 28 may be generated through the execution of test programs 110 and/or test data 112 by test module 108.

Additionally, the method includes forwarding the collected performance data across the wireless network (Block 156). For example, the received and logged performance data are forwarded across the wireless network 22 for analysis by another computer device, such as a user manager 30. Further, in one embodiment, the collected performance data is uploaded from the wireless device in accordance with data collection configuration 25, such as through a standard HTTP, an FTP or some other data transfer protocol.

Further, this embodiment of the method includes analyzing a voice and/or data processing capability of the wireless device based on the received performance data, and/or the associated information/data (Block 158). For example, the performance data may be analyzed by an analysis engine associated with a user manager located across the wireless network from the wireless device. Alternatively, the analysis engine may reside on the wireless device. In one embodiment, the analysis engine may compare selected portions of the performance data 28 with predetermined voice and/or data processing standards 40, to determine device voice and/or data processing performance. Additionally, the analysis may be based on more than one set of performance data. As such, the voice and/or data performance may be based on an analysis of a plurality of device subsystem operations.

Further, this embodiment of the method includes generating a performance report characterizing the voice and/or data processing capabilities of the respective wireless device based on the analyzed performance data (Block 160). For example, this action includes presenting the results, such as performance report 36 defining voice and/or data processing characteristic 38, in a table, a graph, etc.

Additionally, the method optionally may include optimizing a configuration of a wireless device and/or a network component based on the performance report (Block 162). For example, this action includes analysis engine executing optimization module to run predetermined algorithms or programs to optimize the settings of one or more device- and/or network-related configurations to improve a voice and/or data processing capability. In another example, the method may include a technician or analyst reviewing the results and manually making the configuration adjustments. Additionally, it should be noted that the method may be implemented in different locations within the system, in different devices, and by centralized or decentralized processing mechanisms.

Further, the method may include a feedback loop 163 for delivering an updated data collection configuration 25 and/or for delivering new processing configuration settings 44 to the device. For example, the updated collection configuration may be designed to collect additional performance data 28 and/or associated data 54 based on an analysis of the collected data log 52. Also, for example, new processing configuration settings 44 may be generated by optimization module 42 to enhance voice and/or data processing capabilities of the respective device based on the collected data log 52.

Additionally, it should be noted that the method may include granting access to the performance data and/or performance report to other business or commercial systems. To ensure the security and/or integrity of the collected performance data, such access may be granted in a monitored fashion such as through a user manager. Further, other computer devices, including both storage and processing devices, can be located across the wireless network from the wireless device, and accordingly, the architecture associated with the user manager is readily scalable.

In another example of the above-defined method, an end user complains that he/she is not getting the data throughput on their wireless device as specified in a user manual. A help desk associated with the wireless device and/or the wireless network issues a command from the user manager to download the voice and/or data performance module to the wireless device. The help desk configures voice and/or data performance module to collect specific performance data, and other associated information, and configures the upload parameters. The end user uses his/her wireless device in a normal fashion, such as by making normal voice calls and data calls. The voice and/or data performance module collects the predetermined performance data, and associated data, and uploads this information to the user manager as specified in the upload parameters. The user manager processes/analyzes the performance data and generates the performance report. The user manager then notifies the help desk of the report, and the help desk personnel can then make device configuration changes based on the results of the report.

In another example of the above-defined method, a field engineer issues a command from the user manager to download the voice and/or data performance module to a set of wireless devices. The field engineer configures voice and/or data performance module to collect specific performance data and associated data, as well as to run specific scripts/tests. The set of wireless devices are then subjected to a drive test, which due to the recording capabilities of the voice and/or data performance module can be implemented without external test and/or measurement devices. It should be noted that the field engineer does not need to physically be inside the drive test vehicle to monitor the testing, as the monitoring can occur from the user manager. The voice and/or data performance module then performs field tests automatically based on the predetermined configuration, and uploads the collected performance data to the user manager. The user manager processes/analyzes the performance data and generates a performance report. The user manager notifies the field engineer of the performance report, and the field engineer can then make device configuration changes based on the results of the report.

In view of the method being executable on computer platform 64 of a wireless device 12,14,16,18,20, the method includes a program resident in a computer readable medium, where the program directs a wireless device 12,14,16,18,20 having a device platform 64 to perform the steps of the method. Such a program can be executed on any single computer platform, or can be executed in a distributed way among several computer platforms. Furthermore, the method can be implemented by a program that directs a computer device such as user manager 30 to perform a voice and/or data performance determination through gathering and processing performance data 28 from the wireless devices 12,14,16,18, 20.

The computer readable medium can be the memory 82 of the computer platform 64 of the cellular telephone 12, or other wireless device 14,16,18,20, or can be in a local database, such as local database 84 of the device platform 64. Further, the computer readable medium can be in a secondary storage media that is loadable onto a wireless device computer platform, such as a magnetic disk or tape, optical disk, hard disk, flash memory, or other storage media as is known in the art.

Further, the method may be implemented, for example, by operating portion(s) of the wireless network 22 and/or LAN 60, such as device platform 64 and user manager 30, to execute a sequence of machine-readable instructions. The instructions can reside in various types of signal-bearing or data storage primary, secondary, or tertiary media. The media may comprise, for example, RAM (not shown) accessible by, or residing within, the components of the wireless network 22 or LAN 60. Whether contained in RAM, a diskette, or other secondary storage media, the instructions may be stored on a variety of machine-readable data storage media, such as DASD ("direct access storage device") storage (e.g., a conventional "hard drive" or a RAID ("redundant array of independent disks") array), magnetic tape, electronic read-only memory (e.g., ROM, EPROM, or EEPROM), flash memory cards, an optical storage device (e.g. CD-ROM, WORM (write once, read many), DVD, digital optical tape), paper "punch" cards, or other suitable data storage media including digital and analog transmission media.

In summary, the apparatus can be implemented solely on any wireless device 12,14,16,18,20. The wireless device can have at least one voice/data performance module 24, including an application or agent resident (either permanent or temporarily) on the computer platform 64 thereof which causes the gathering of performance data 28 from communications processing engine 86, and which can effect selective transmission of the performance data for that wireless device to another computer device (such as user manager 30) on the wireless network 22. If the wireless device 12,14,16,18,20 is so embodied, performance data 28 may be transmitted over an open communication connection from the wireless device 12,14,16,18,20 to the wireless network 22, such as an open voice or data call. If the wireless device is a cellular telephone 12 and the wireless network is a cellular telecommunication network, such as shown in FIG. 2, performance data 28 can be transmitted through short message service or other wireless communication methods. User manager 30 then applies analysis engine 32 to the collected performance data 28, and generates performance report 36 that details various voice and/or data processing performance characteristics 38 of the respective wireless device. Based on this report 36, or by implementation of optimization module 42, operational settings of the respective wireless device and/or of the wireless network may be modified to enhance voice and/or data processing capabilities.

While the foregoing disclosure shows illustrative embodiments, it should be noted that various changes and modifications could be made herein without departing from the scope of the described embodiments as defined by the appended claims. Furthermore, although elements of the described embodiments may be described or claimed in the singular, the plural is contemplated unless limitation to the singular is explicitly stated.

What is claimed is:

1. An apparatus for determining a processing performance of a wireless device, comprising:
a processor configured to:
transmit a voice/data performance module to the wireless device over a wireless network;
generate a data collection configuration comprising retrieval parameters associated with defined types of performance data, the retrieval parameters including a parameter relating to when to collect the performance data and a parameter relating to when to transmit the collected performance data back to the apparatus, and the performance data comprising at least radio link protocol (RLP) level data selected from the group consisting of frame/byte count for received/sent, erasures received, negative acknowledgements received/ sent, idle, fill, other frame counts for received/sent, largest continuous erasure, reset count and abort count;
receive collected performance data of the wireless device over the wireless network, collected based on a data collection configuration and further based on execution of the voice/data performance module on the wireless device;
analyze the collected performance data to determine at least one data processing characteristic of the wireless device;
generate a new device configuration operable to change the at least one data processing characteristic of the wireless device; and
transmit the new device configuration to the wireless device over the wireless network.

2. The apparatus of claim 1, wherein the performance data further comprises performance data that is selected from the group consisting of data relating to voice call application performance, data call application performance, voice over internet protocol ("VoIP") application performance, text messaging application performance, video application performance, multimedia application performance, internet protocol ("IP") services performance, protocol processing performance, troubleshooting diagnosis, and configuration evaluation.

3. The apparatus of claim 1, wherein the performance data further comprises at least one of voice call information, data call information, application level protocol data, data link layer protocol data, data associated with troubleshooting, data associated with a utility, and Ping utility-related information.

4. The apparatus of claim 1, further comprising an analysis engine executable by the processor to generate a performance report comprising the at least one data processing characteristic.

5. The apparatus of claim 4, further comprising a voice/data processing standard, and wherein the analysis engine is operable to compare the collected performance data to the voice/data processing standard to generate the performance report.

6. The apparatus of claim 1, further comprising an optimization module having an optimization algorithm executable by the processor to generate the new device configuration.

7. The apparatus of claim 1, wherein the processor is further configured to generate the data collection configuration including a predetermined test to perform on the wireless device in order to generate the collected performance data.

8. The apparatus of claim 7, wherein the predetermined test comprises a simulated input from a wireless network component.

9. The apparatus of claim 1, wherein the processor is further configured to generate the data collection configuration, including defining associated data to collect, wherein the associated data comprises data associated with the wireless device and with the performance data.

10. The apparatus of claim 1, wherein the collected performance data further comprises forward traffic channel data throughput and reverse traffic channel data throughput corresponding to the execution of the voice/data performance module on the wireless device.

11. The apparatus of claim 1, wherein the collected performance data comprises application duration of use data corresponding to the execution of the voice/data performance module on the wireless device.

12. The apparatus of claim 1, wherein the performance data further comprise application-layer data comprising one or more of file transfer protocol (FTP) data, browser protocol data, transmission control protocol (TCP) data, Internet protocol (IP) data, hypertext transfer protocol (HTTP) data, user datagram protocol (UDP) data, and Internet Control Message Protocol (ICMP) data.

13. An apparatus for determining at least one of voice processing performance and data processing performance of a wireless device, comprising:
  means for transmitting a voice/data performance module over a wireless network to the wireless device;
  means for generating a data collection configuration comprising retrieval parameters associated with defined types of performance data, the retrieval parameters including a parameter relating to when to collect the performance data and a parameter relating to when to transmit the collected performance data back to the apparatus, and the performance data comprising at least radio link protocol (RLP) level data selected from the group consisting of frame/byte count for received/sent, erasures received, negative acknowledgements received/sent, idle, fill, other frame counts for received/sent, largest continuous erasure, reset count and abort count;
  means for transmitting data collection configuration over the wireless network to the wireless device;
  means for receiving the collected performance data of the wireless device, collected based on the data collection configuration and further based on execution of the voice/data performance module on the wireless device;
  means for analyzing the collected performance data to determine at least one data processing characteristic of the wireless device;
  means for generating a new device configuration operable to change the at least one data processing characteristic of the wireless device, wherein the new device configuration is based on the collected performance data; and
  means for transmitting the new device configuration over the wireless network to the wireless device.

14. A wireless device, comprising:
  a processor configured to:
    receive a voice/data performance module over a wireless network;
    receive a data collection configuration over the wireless network, the data collection configuration defining types of performance data to collect from a computer platform of the wireless device, the data collection configuration further comprising retrieval parameters associated with types of performance data, the retrieval parameters including a parameter relating to when to collect the performance data and a parameter relating to when to transmit the collected performance data back to the apparatus, and the performance data comprising at least radio link protocol (RLP) level data selected from the group consisting of frame/byte count for received/sent, erasures received, negative acknowledgements received/sent, idle, fill, other frame counts for received/sent, largest continuous erasure, reset count and abort count;
    execute a voice/data performance module;
    collect selected ones of a plurality of performance data, based on the data collection configuration;
    selectively transmit the collected performance data; and
    receive a new device configuration over the wireless network, the new device configuration operable to change at least one data processing characteristic of the wireless device, wherein the new device configuration is based on the selected ones of the plurality of performance data.

15. The wireless device of claim 14, wherein the plurality of performance data further comprise at least one of signal strength, frame error rate, latency, fading, signal-to-noise ratio, signal pollution from another communications device, signal acquisition rate, voice call establishment rate, overall data throughput, data throughput of a given component of the wireless device, and a number of data re-transmissions.

16. The wireless device of claim 14, wherein the plurality of performance data further comprise at least one of voice call information, data call information, application level protocol data, data link layer protocol data, data associated with troubleshooting, data associated with a utility, and Ping utility-related information.

17. The device of claim 14, wherein the processor is further configured to selectively transmit the selected ones of the plurality of performance data to another computer device across a wireless network.

18. The device of claim 14, wherein the voice/data performance module further comprises at least one of a test program and test data, and wherein the processor is further configured to execute the test program and test data to generate the selected ones of the plurality of performance data.

19. The device of claim 14, wherein the wireless device comprises a cellular telephone and wherein the wireless network comprises a cellular telephone network.

20. The wireless device of claim 14, wherein the collected performance data further comprises forward traffic channel data throughput and reverse traffic channel data throughput corresponding to the execution of the voice/data performance module on the wireless device.

21. The wireless device of claim 14, wherein the collected performance data further comprises application duration of use data corresponding to the execution of the voice/data performance module on the wireless device.

22. The wireless device of claim 14, wherein the performance data further comprise application-layer data comprising one or more of file transfer protocol (FTP) data, browser protocol data, transmission control protocol (TCP) data, Internet protocol (IP) data, hypertext transfer protocol (HTTP) data, user datagram protocol (UDP) data, and Internet Control Message Protocol (ICMP) data.

23. A wireless device, comprising:
means for receiving a voice/data performance module over a wireless network from a user manager server;
means for receiving a data collection configuration from a user manager server over the wireless network, the data collection configuration defining types of performance data to retrieve from a computer platform of the wireless device, the data collection configuration further comprising retrieval parameters associated with the defined types of performance data, the retrieval parameters including a parameter relating to when to collect the performance data and a parameter relating to when to transmit the collected performance data back to the apparatus, and the performance data comprising at least radio link protocol (RLP) level data selected from the group consisting of frame/byte count for received/sent, erasures received, negative acknowledgements received/sent, idle, fill, other frame counts for received/sent, largest continuous erasure, reset count and abort count;
means for executing the voice/data performance module;
means for collecting selected ones of a plurality of performance data of the wireless device, based on the data collection configuration;
means for selectively transmitting the collected performance data to the user manager server over the wireless network; and
means for receiving a new device configuration from the user manager server over the wireless network, the new device configuration operable to change at least one data processing characteristic of the wireless device, wherein the new device configuration is based on the collected performance data.

24. A method of determining a processing performance of a wireless device, comprising:
transmitting a voice/data performance module over a wireless network to the wireless device;
generating a data collection configuration comprising retrieval parameters associated with defined types of performance data, the retrieval parameters including a parameter relating to when to collect the performance data and a parameter relating to when to transmit the collected performance data back to the apparatus, and the performance data comprising at least radio link protocol (RLP) level data selected from the group consisting of frame/byte count for received/sent, erasures received, negative acknowledgements received/sent, idle, fill, other frame counts for received/sent, largest continuous erasure, reset count and abort count;
transmitting the data collection configuration over a wireless network to the wireless device;
receiving, at a processor, collected performance data of a wireless device collected based on the data collection configuration and further based on execution of the voice/data performance module on the wireless device;
analyzing the collected performance data to determine at least one data processing characteristic of the wireless device;
generating a new device configuration operable to change the at least one data processing characteristic of the wireless device, wherein the new device configuration is based on the collected performance data; and
transmitting the new device configuration to the wireless device over the wireless network.

25. The method of claim 24, further comprising selecting further performance data from a plurality of performance data associated with a processing engine on a computer platform of the wireless device, and dictating to the wireless device when to collect the selected performance data and when to transmit the collected performance data.

26. The method of claim 24, wherein the received collected performance data are further generated by execution of at least one of a test program and test data on the wireless device.

27. The method of claim 24, further comprising transmitting a command to the wireless device over the wireless network to execute a selected test program, wherein the received collected performance data are further generated by execution of the selected test program.

28. The method of claim 24, further comprising transmitting at least one of a test program and test data to the wireless device over the wireless network, where the test program and the test data are executable by the wireless device to generate the collected performance data.

29. The method of claim 24, where analyzing the collected performance data further comprises comparing the collected performance data with a predetermined voice/data processing standard.

30. The method of claim 24, wherein the collected performance data further comprise at least one of voice call application performance-related data, data call application performance-related data, voice over internet protocol ("VoIP") application performance-related data, text messaging application performance-related data, video application performance-related data, multimedia application performance-related data, Internet Protocol services performance-related data, protocol processing performance-related data, troubleshooting diagnosis-related data, and configuration evaluation-related data.

31. The method of claim 24, wherein the collected performance data further comprise at least one of voice call information, data call information, application level protocol data, data link layer protocol data, radio link protocol level data, data associated with troubleshooting, data associated with a utility, and Ping utility-related information.

32. The method of claim 24, wherein the collected performance data further comprises forward traffic channel data throughput and reverse traffic channel data throughput corresponding to the execution of the voice/data performance module on the wireless device.

33. The method of claim 24, wherein the collected performance data further comprises application duration of use data corresponding to the execution of the voice/data performance module on the wireless device.

34. The method of claim 24, wherein the performance data further comprise application-layer data comprising one or more of file transfer protocol (FTP) data, browser protocol data, transmission control protocol (TCP) data, Internet protocol (IP) data, hypertext transfer protocol (HTTP) data, user datagram protocol (UDP) data, and Internet Control Message Protocol (ICMP) data.

35. A computer program resident in a non-transitory computer readable medium that, when executed, directs a wireless device to perform the actions of:
  receiving a voice/data performance module over a wireless network from a user manager server;
  receiving, at a processor, a data collection configuration over a wireless network from the user manager server, the data collection configuration defining types of performance data to collect from a computer platform of the wireless device, the data collection configuration comprising retrieval parameters associated with the defined types of performance data, the retrieval parameters including a parameter relating to when to collect the performance data and a parameter relating to when to transmit the collected performance data back to the apparatus, and the performance data comprising at least radio link protocol (RLP) level data selected from the group consisting of frame/byte count for received/sent, erasures received, negative acknowledgements received/sent, idle, fill, other frame counts for received/sent, largest continuous erasure, reset count and abort count;
  executing the voice/data performance module;
  collecting selected ones of a plurality of performance data of the wireless device, based on the data collection configuration;
  selectively transmitting the collected performance data over the wireless network to the user manager server; and
  receiving a new device configuration over the wireless network from the user manager server, the new device configuration operable to change at least one data processing characteristic of the wireless device, wherein the new device configuration is based on the collected performance data.

36. At least one processor configured to perform the actions of:
  receiving a voice/data performance module over a wireless network from a user manager server;
  receiving a data collection configuration defining types of performance data to collect from a computer platform of the wireless device, the data collection configuration comprising retrieval parameters associated with the defined types of performance data, the retrieval parameters including a parameter relating to when to collect the performance data and a parameter relating to when to transmit the collected performance data back to the user manager server, and the performance data comprising at least radio link protocol (RLP) level data selected from the group consisting of frame/byte count for received/sent, erasures received, negative acknowledgements received/sent, idle, fill, other frame counts for received/sent, largest continuous erasure, reset count and abort count;
  executing the voice/data performance module;
  collecting selected ones of a plurality of performance data of the wireless device, based on the data collection configuration;
  selectively transmitting the collected performance data over a wireless network to the user manager server; and
  receiving a new device configuration over a wireless network from the user manager server, the new device configuration operable to change at least one data processing characteristic of the wireless device, wherein the new device configuration is based on the collected performance data.

37. At least one processor configured to perform the actions of:
  transmitting a voice/data performance module over a wireless network to a wireless device;
  generating a data collection configuration comprising retrieval parameters associated with defined types of performance data, the retrieval parameters including a parameter relating to when to collect the performance data and a parameter relating to when to transmit the collected performance data back to the at least one processor, and the performance data comprising at least radio link protocol (RLP) level data selected from the group consisting of frame/byte count for received/sent, erasures received, negative acknowledgements received/sent, idle, fill, other frame counts for received/sent, largest continuous erasure, reset count and abort count;
  receiving collected performance data of the wireless device, collected based on the data collection configuration and further based on execution of the voice/data performance module on the wireless device;
  analyzing the collected performance data to determine at least one data processing characteristic of the wireless device;
  generating a new device configuration operable to change the at least one data processing characteristic of the wireless device, wherein the new device configuration is based on the collected performance data; and
  transmitting the new device configuration over the wireless network to the wireless device.

38. A computer program resident in a non-transitory computer readable medium that, when executed, directs a computer device to perform the actions of:
  transmitting a voice/data performance module over a wireless network to a wireless device;
  generating a data collection configuration comprising retrieval parameters associated with defined types of performance data, the retrieval parameters including a parameter relating to when to collect the performance data and a parameter relating to when to transmit the collected performance data back to the apparatus, and the performance data comprising at least radio link protocol (RLP) level data selected from the group consisting of frame/byte count for received/sent, erasures received, negative acknowledgements received/sent, idle, fill, other frame counts for received/sent, largest continuous erasure, reset count and abort count;
  transmitting the data collection configuration over a wireless network to the wireless device;
  receiving collected performance data of the wireless device, collected based on the data collection configuration and further based on execution of the voice/data performance module on the wireless device;
  analyzing the collected performance data to determine at least one data processing characteristic of the wireless device;
  generating a new device configuration operable to change the at least one data processing characteristic of the wireless device, wherein the new device configuration is based on the collected performance data; and transmitting the new device configuration to the wireless device over the wireless network.

39. A method of determining a processing performance of a wireless device, comprising:

receiving a voice/data performance module over a wireless network from a user manager server;

receiving a data collection configuration from the user manager server, the data collection configuration defining types of performance data to retrieve from a computer platform of the wireless device, the data collection configuration comprising retrieval parameters associated with the defined types of performance data, the retrieval parameters including a parameter relating to when to collect the performance data and a parameter relating to when to transmit the collected performance data back to the user manager server, and the performance data comprising at least radio link protocol (RLP) level data selected from the group consisting of frame/byte count for received/sent, erasures received, negative acknowledgements received/sent, idle, fill, other frame counts for received/sent, largest continuous erasure, reset count and abort count;

executing the voice/data performance module;

collecting selected ones of a plurality of performance data of the wireless device based on the data collection configuration;

selectively transmitting the collected performance data; and receiving a new device configuration from the user manager server over the wireless network, the new device configuration operable to change at least one data processing characteristic of the wireless device, wherein the new device configuration is based on the collected performance data.

40. The method of claim 39, further comprising:

receiving at least one of a test program and test data from across the wireless network, wherein the one of the test program and test data are executable by the wireless device to generate the collected performance data; and executing the received one of the test program and the test data.

41. The method of claim 39, further comprising receiving a command to execute a selected test program on the wireless device, wherein the collected performance data are further generated by execution of the selected test program.

42. The method of claim 39, wherein the collected performance data further comprise at least one of voice call application performance-related data, data call application performance-related data, voice over internet protocol ("VoIP") application performance-related data, text messaging application performance-related data, video application performance-related data, multimedia application performance-related data, Internet Protocol services performance related data, protocol processing performance-related data, troubleshooting diagnosis-related data, and configuration evaluation-related data.

43. The method of claim 39, wherein the collected performance data further comprise at least one of voice call information, data call information, application level protocol data, data link layer protocol data, radio link protocol level data, data associated with troubleshooting, data associated with a utility, and Ping utility-related information.

44. The method of claim 39, wherein the collected performance data further comprises forward traffic channel data throughput and reverse traffic channel data throughput corresponding to the execution of the voice/data performance module on the wireless device.

45. The method of claim 39, wherein the collected performance data further comprises application duration of use data corresponding to the execution of the voice/data performance module on the wireless device.

46. The method of claim 39, wherein the performance data further comprise application-layer data comprising one or more of file transfer protocol (FTP) data, browser protocol data, transmission control protocol (TCP) data, Internet protocol (IP) data, hypertext transfer protocol (HTTP) data, user datagram protocol (UDP) data, and Internet Control Message Protocol (ICMP) data.

* * * * *